Dec. 3, 1968 O. E. GRUE 3,414,758

APPARATUS FOR REPRODUCING COLORED TELEVISION SIGNALS

Filed July 10, 1964 3 Sheets-Sheet 1

INVENTOR.
Olav Ebbesen Grue
BY Dicke + Craig
ATTORNEYS

INVENTOR.
Olav Ebbesen Grue
BY Dicke & Craig
ATTORNEYS

INVENTOR.
Olav Ebbesen Grue
BY Dicke & Craig
ATTORNEYS

United States Patent Office 3,414,758

Patented Dec. 3, 1968

3,414,758

APPARATUS FOR REPRODUCING COLORED TELEVISION SIGNALS

Olav Ebbesen Grue, 17 Guldregnvaenget, Virum, Copenhagen, Denmark

Filed July 10, 1964, Ser. No. 388,330

Claims priority, application Great Britain, July 11, 1963, 27,532/63

13 Claims. (Cl. 315—13)

ABSTRACT OF THE DISCLOSURE

An electron beam dynamic convergence system for color television wherein rectifiers are connected between the source of convergence corrections signals and each end of each convergence coil with a separate potentiometer connected in series with each rectifier to adjust the dynamic convergence of each beam independently on each side of a middle zone of the picture screen.

Figure 1:
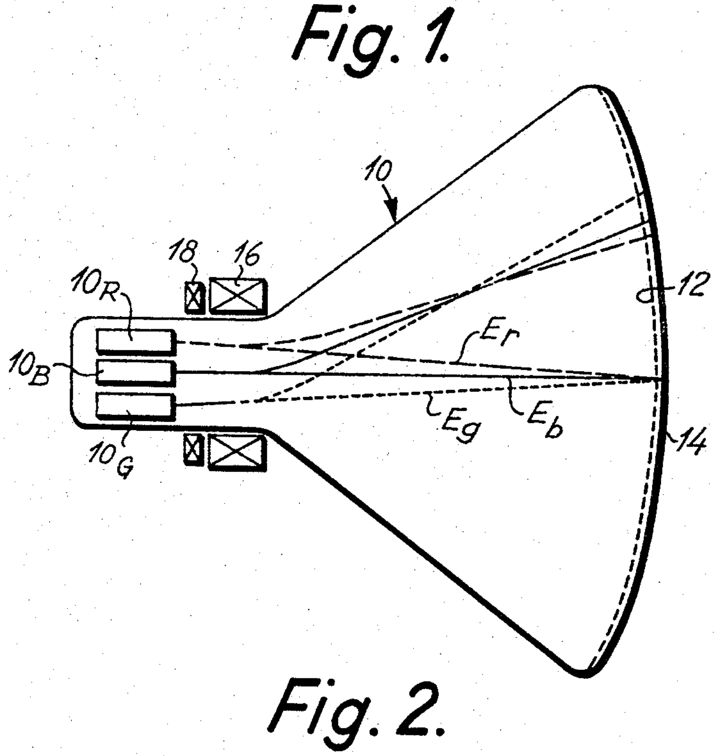

The present invention relates to an apparatus for receiving and reproducing color television signals.

It is a purpose of the invention to provide a color television signal receiving and reproducing apparatus in which adjustment of dynamic convergence of the beams can be facilitated.

It is a further purpose of the invention to provide a color television signal receiving and reproducing apparatus in which the signals are reproduced in a shadow mask picture tube having a plurality of electron beam emitting guns and in which convergence adjustment of the electron beams can be manually performed by adjustment of a plurality of means independently for each of the electron beams.

Still a further purpose of the invention is to provide a color television signal receiving and reproducing apparatus in which convergence of a plurality of electron beams can be adjusted substantially independently for each of the electron beams and independently for each of two half parts of a picture screen scanned by said electron beams.

Still a further purpose of the invention is to provide a color television signal receiving and reproducing apparatus in which the signals are reproduced in a shadow mask picture tube having three electron beam emitting guns, the electron beams of which are operable to scan a picture screen and in which adjustment of dynamic vertical convergence of said three beams can be performed by adjustment of six adjustment means, viz. two adjustment means for each electron beam, one of which adjustment means is used for adjusting dynamic vertical convergence of the corresponding electron beam while scanning the upper half of said picture screen and the other adjustment means is used for adjusting dynamic vertical convergence of the corresponding electron beam while scanning the lower half of the said picture screen.

Still a further purpose of the invention is to provide a color television signal receiving and reproducing apparatus in which vertical dynamic convergence of the electron beams can be adjusted by applying saw-tooth shaped voltage impulses having a leading peak to electromagnetic means provided adjacent each of the electron guns in a shadow mask picture tube and by adjusting the wave-form and amplitude of said impulses.

Still a further purpose of the invention is to provide a circuit arrangement in a color television signal reproducing circuit comprising a shadow mask picture tube in which a series of saw-tooth voltage impulses having a leading peak are supplied to electromagnetic vertical dynamic convergence adjustment coil means mounted adjacent the electron beam guns of said tube through a two-branched current path in which the impulses are divided in two parts each of which corresponds in time to the scanning of said electron beams over one half-part of said screen where said circuit arrangement comprises means for adjusting the amplitude of said impulse parts independently for each electromagnetic coil means and for each impulse part, thereby effectively providing correction possibilities for dynamic misconvergence of each electron beam occurring in response to the scanning of said beam over one half-part of the screen.

Figure 2:
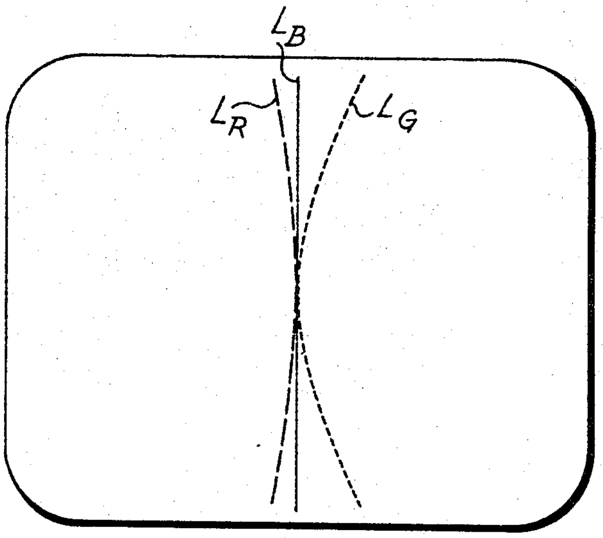
Figure 3:
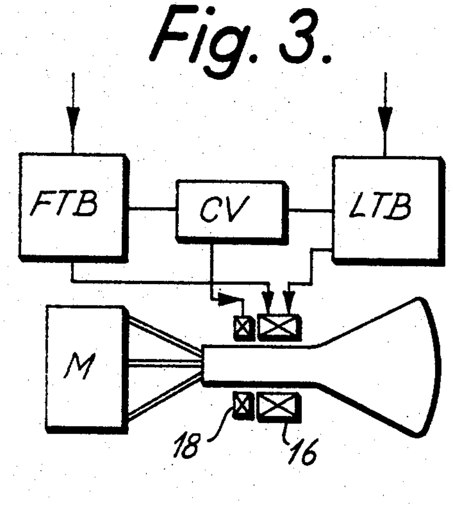
Figure 4:
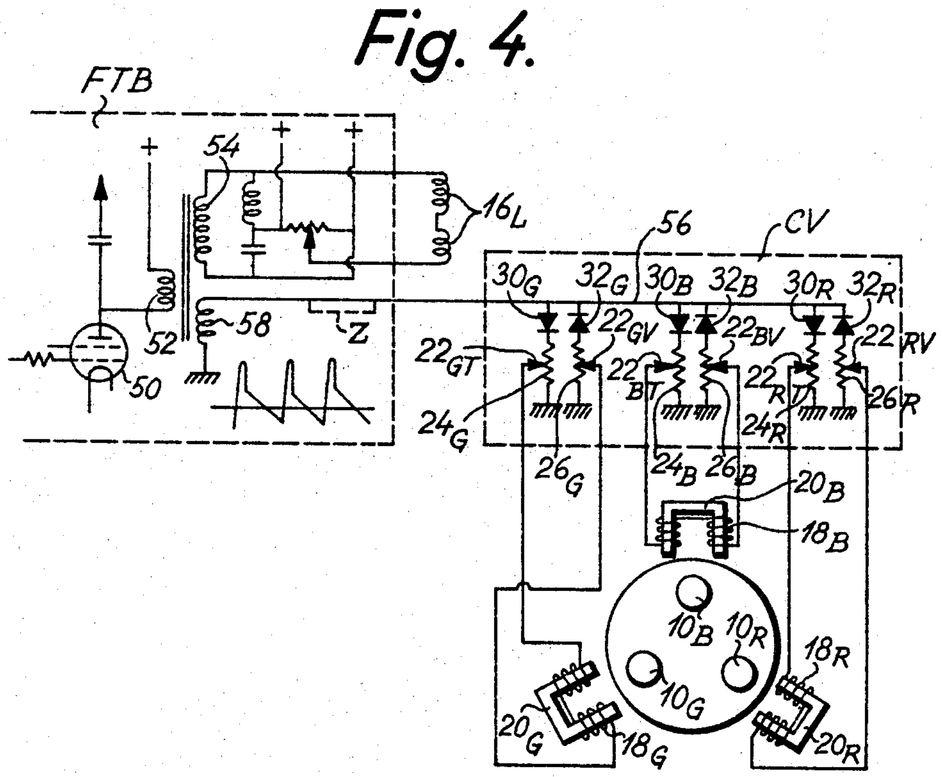
Figure 5:
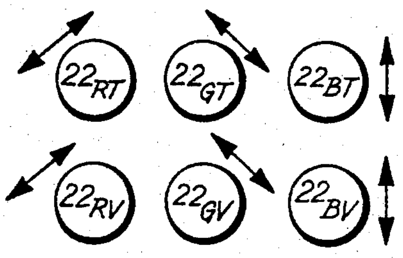
Figure 6:
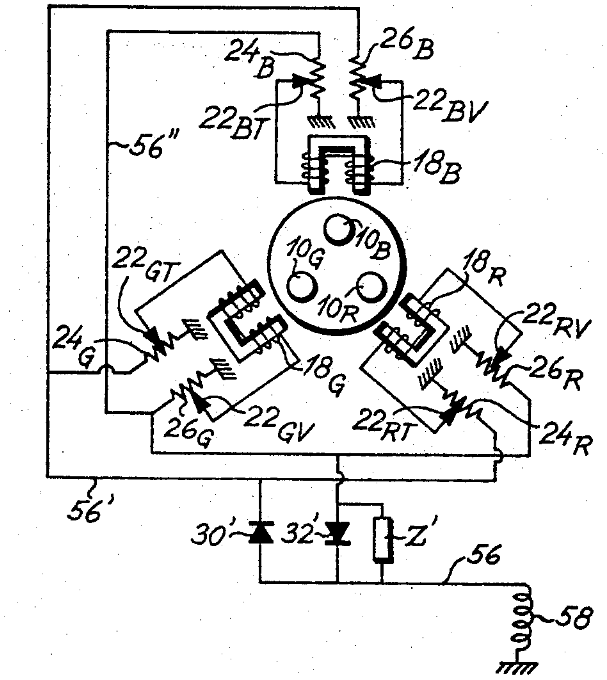

The invention will be further described in the following with reference to the accompanying drawing in which:

FIGURE 1 is a schematic horizontal section of a shadow mask picture tube for color television, FIGURE 2 is a front view of the picture tube with curves illustrating dynamic misconvergence, FIGURE 3 is a block diagram of a part of a color television receiver, FIGURE 4 is a simplified circuit diagram of a part of the block diagram of FIGURE 3, FIGURE 5 is a schematic illustration of the control panel for that part of the apparatus according to the invention, which is shown in FIGURE 4, and FIGURE 6 is a simplified circuit diagram illustrating a modified embodiment of the apparatus shown in FIGURE 4.

In broad terms the drawings illustrate an apparatus for receiving and reproducing color television signals. The apparatus has a shadow mask picture tube generally designated by 10 including a picture screen 14 on the interior surface of which a plurality of dots of material are provided, which are adapted to become fluorescent in different colors in response to being activated by an electron beam. Adjacent the screen 14 a shadow mask or a raster 12 is provided having a plurality of holes. In the neck portion of the tube a plurality of electron guns $\mathbf{10}_R$, $\mathbf{10}_B$, $\mathbf{10}_G$ are mounted operable to produce electron beams, which by means of suitable deflection means are operable to scan the picture screen and thereby activate the fluorescent material dots. The picture tube 10 is also provided with means 18 operable to correct for dynamic misconvergence in response to deflection of the beams, which means 18 are operatively connected with each of the electron guns $\mathbf{10}_R$, $\mathbf{10}_B$ and $\mathbf{10}_G$. In the apparatus deflection control means are provided operable to produce shift impulses and being operatively connected with the deflection means 16 to move the beams through a path across the picture screen 14 from one side thereof to the other. In the deflection control means FTB (FIGURE 4), means 52, 58 is provided to derive impulses therefrom for use in divergence control, and means generally referred to by CV, operatively connects the impulse deriving means with the dynamic convergence means 18, in which the impulses produce current of suitable waveform to correct for dynamic misconvergence. The connection means CV comprises means 30 operable to render a first period of said impulse which corresponds to a first portion of the travel path of the beams across the picture screen 14 operable to control the dynamic convergence means 18, and second means 32 operable to render a second period of the impulse which corresponds to a second portion of the travel path operable to control the dynamic convergence means 18, and adjustment means $\mathbf{22}_{GT}$, $\mathbf{22}_{RT}$, $\mathbf{22}_{BT}$ and $\mathbf{22}_{GV}$, $\mathbf{22}_{RV}$, $\mathbf{22}_{BV}$ respectively for the dynamic convergence means 18 operable independently during each of the portions of the impulses and thereby at each end of the travel paths of the beams.

More specifically with reference to FIGURE 1 of the drawings, 10 designates a shadow mask picture tube for reproducing color television signals. The tube 10 has three electron guns $\mathbf{10}_R$, $\mathbf{10}_B$, $\mathbf{10}_G$ which are mounted in the tube neck substantially symmetrically with respect to the geometrical axis of the tube. The tube, furthermore, has a shadow mask or raster 12 having a large number of small holes or perforations. Beyond this shadow mask 12 seen from the guns the picture screen 14 of the tube is provided with dots of material, which is fluorescent in three colors in response to activation by electron beams passing through the holes. These dots are placed in such a way that when the three electron beams $E_r$, $E_b$, $E_g$ converge in a hole of the mask 12, each of the beams will activate a corresponding dot of fluorescent material, so that each of these three beams corresponds to one particular color, i.e. the gun $10_R$ corresponds to a red color, the gun $10_B$ corresponds to blue color, and the gun $10_G$ corresponds to green color dots.

The scan of the picture screen is controlled in the same manner as in an ordinary black and white television picture tube by means of deflection coils 16.

The directions of the three electron beams $E_r$, $E_b$, $E_g$ are adjustable by means of magnetic fields. Thus, by means of suitable adjustment magnets (not shown) the so-called static convergence may be adjusted, so that the beams converge in the desired manner in the middle zone of the picture screen.

Since the three beams $E_r$, $E_b$, $E_g$ do not coincide in the deflection field because the three electron guns are spaced, a misconvergence will occur during the scanning of the screen 14 as illustrated in FIGURES 1 and 2. Seen from the top the blue electron beam $E_b$ is placed in the middle, whereby the deflection field will cause the red beam $E_r$ to be deflected less than the blue beam, and the green beam to be deflected more than the two others, so that the convergence point (or rather convergence points) of the three beams will move inwards into the tube when the beams are deflected in a direction towards the edge of the picture screen 14.

In order to compensate for this lack of convergence, which is caused by the geometrical characteristics of the picture tube, convergence correction means are placed around the tube neck in the form of coils 18, to which voltage impulses are supplied. Such convergence adjustment coils 18 are provided for each of the three electron beams and are adapted to correct for lack of vertical dynamic convergence as well as for lack of horizontal dynamic convergence.

The dynamic convergence coils 18 are to this effect supplied with different impulses to correct for the horizontal and vertical misconvergence, respectively, such as described in detail in the literature (see for example P.S. Carnt and G. B. Townsend: "Color Television," Iliffe Books Ltd., 1961). The waveform of these impulses must be substantially parabolic in order to compensate for misconvergence in all regions of the picture screen. The aim of the convergence adjustment is to cause the three electron beams to converge in the holes of the raster over the entire surface of the screen.

FIGURE 2 illustrates how lack of vertical dynamic convergence manifests itself on the picture screen. By reproduction of straight line pattern signals, and with correct convergence adjustment the three electron beams $E_r$, $E_b$, $E_g$ of FIGURE 1 should draw three vertical traces on the screen, which coincide to produce the visible result of a single vertical white line as well-known in the art.

The adjustment of the static convergence adjustment means, however, only provides the possibility of correcting for deviations of the blue trace $L_B$ from a straight line, while simultaneously the red and the green traces on the screen $L_R$ and $L_G$ have the shape of oppositely convex arcuate lines. By means of the static convergence means the arcuate traces $L_R$ and $L_G$ may be displaced in such a manner that their apices coincide with the straight blue trace $L_B$ although not always in the same point, but further adjustment of convergence must be performed by using the dynamic convergence adjustment means 18.

As mentioned hereinbefore, the impulses applied to the coils 18 result in currents of parabolic waveform therein. By varying the amplitude of the parabolas and/or the amplitude of the tilt of said parabolas for each of the vertical and horizontal dynamic convergence correction coils it is possible to correct for the misconvergence to such an extent that it is substantially not visible.

In the commercially available color television sets different convergence adjustment knobs are used for each of the colors as well as for the tilt and curvature of each of the parabolic current impulses through the coils 18, respectively, which gives a total of twelve adjustment knobs, viz, four for each electron gun of which two are used for horizontal dynamic convergence, and two for vertical dynamic convergence, but the adjustment is difficult. If in the case of misconvergence, as illustrated in FIGURE 2, it is desired to adjust the upper half of the green trace $L_G$, it is necessary to give the corresponding parabola-shaped impulse a certain amount of tilt and a certain curvature or amplitude. This adjustment, however, will also influence the position of the lower half of said green trace $L_B$, and since in many cases the green trace will not be symmetrical around the horizontal middle line of the screen, the upper half may be brought to coincide with the vertical blue traces $L_B$, while the lower half still diverges from this correct vertical position at least towards the left and right edges of the screen, and in addition dynamic convergence adjustment affects the static convergence adjustment and thereby requires readjustment thereof during the adjustments of the dynamic convergence to obtain an optimum of static convergence at the center.

The same may occur for the two other color traces $L_B$ and $L_R$, and in addition each adjustment of each color effects the already made adjustment of the other colors.

As it will be appreciated, it requires considerable skill on the part of the personnel in television receiver factories making this final adjustment of the sets, and the adjustment is also time-consuming and results in additional labor costs during this stage of production.

The block diagram shown in FIGURES 3 illustrates the connections between those circuits parts of a color television receiver, which are closest to the picture tube. The video and color signals, which are demodulated and separated from synchronizing impulses etc. in a manner commonly known by those skilled in the art, are supplied to the picture tube from a circuit generally designated by M.

The deflection coils 16 are supplied with line shift and frame shift impulses from the two circuits LTB and FTB, respectively, and the convergence coils 18 are supplied with impulses, which are processed in a convergence circuit CV, which also includes the adjustment means.

The parabolic currents in the convergence coils are produced by applying saw-tooth-shaped voltage impulses having a leading peak to the coils, and in as far as the convergence correction for each single point of the screen varies in response to the position of the point on the screen, it is natural to derive these impulses from either of the circuits FTB and LTB, which control the deflection, and in which such saw-tooth-shaped impulses having a leading peak are produced for the deflection.

The circuit FTB thus has an input for synchronization impulses and includes a generator (not shown) for saw-tooth-shaped impulses having a leading peak.

In the simplified circuit diagram shown in FIGURE 4, which illustrated an embodiment according to the invention, only the output portion of the FTB circuit is shown. The output step comprises an electronic tube 50 in the anode circuit of which the primary winding 52 of a transformer is included. One secondary winding 54 of this this transformer is connected through a suitable circuit arrangement with the deflection coils $16_L$ of the picture tube for vertical deflection.

In the simplified diagram of FIGURE 4 only the vertical dynamic convergence coils are shown, and in the convergence adjustment circuit CV only the corresponding part of the circuit relating to vertical dynamic convergence, which is supplied from the FTB circuit is shown.

The convergence coils $\mathbf{18}_B$, $\mathbf{18}_G$ and $\mathbf{18}_R$ are mounted on magnetic cores $\mathbf{20}_B$, $\mathbf{20}_G$ and $\mathbf{20}_R$, respectively, which are each positioned adjacent the end of the corresponding electron guns $\mathbf{10}_B$, $\mathbf{10}_G$ and $\mathbf{10}_R$. The magnetic cores $\mathbf{20}_B$, $\mathbf{20}_G$ and $\mathbf{20}_R$ have two legs on each of which the half part of each convergence coil $\mathbf{18}_B$, $\mathbf{18}_G$ and $\mathbf{18}_R$ is mounted and connected in series.

The ends of the coils are connected with variable tappings of three pairs of adjustable potentiometers designated by 24 and 26 with indexes G, B and R corresponding to the index letters of the coils with which they are connected. The lower ends of the potentiometers are connected with reference level, and the upper ends are connected through electronic valves or diodes designated 30 and 32 with indexes corresponding to those of the potentiometers, which diodes are in turn connected with a common lead 56.

The diodes $\mathbf{30}_G$, $\mathbf{30}_B$ and $\mathbf{30}_R$ are connected in such a manner that they permit current flow in a direction away from the common lead 56, and the diodes $\mathbf{32}_G$, $\mathbf{32}_B$ and $\mathbf{32}_R$ are oppositely orientated, so that they only permit current flow in a direction towards the common lead 56.

The common lead 56 is in the FTB circuit connected with a second secondary winding 58 on the output transformer of the tube 50, whereby impulses corresponding to those which are generated in the FTB circuit and supplied to the vertical deflection coils $\mathbf{16}_L$ are supplied to the CV circuit.

These impulses generated in the FTB circuit are shown in the lower right side of said circuit in FIGURE 4, and comprise positive and negative half-periods of saw-tooth-shape, the positive half-periods being furthermore provided with a leading peak, i.e. a very short and pointed impulse with a relatively high maximum voltage originating from the return impulses applied to the FTB circuit from the vertical deflection coils $\mathbf{16}_L$.

As the total amplitude of the impuses described is utilized for the vertical deflection, this mean that the positive half-period of each impulse is used for the vertical deflection over one half part of the screen, and that the negative half-period is utilized for the vertical deflection over the other half part of the picture screen.

This particular phenomenon is utilized in order to obtain the improved convergence adjustment according to the invention.

By dividing the current supply circuit to each of the convergence coils 18 into two separate branches of which one is blocked against positive half-periods of the impulses and the other branch is blocked against the negative half periods, and by furthermore rendering two branches adjustable independently, a system is provided in which one set of the variable tappings of the potentiometers through which current flow takes place in one direction can be used for adjusting the dynamic convergence over one half part of the screen, while the other set of tappings can be used for adjusting the convergence over the other half part of the screen.

Assuming that the positive half-periods correspond to the upper half of the picture screen and the negative half-periods correspond to the lower half of the screen, this means that the variable tappings designated by $\mathbf{22}_{GT}$, $\mathbf{22}_{BT}$ and $\mathbf{22}_{RT}$ correspond to convergence adjustment on the upper half-screen, and that the tappings $\mathbf{22}_{GV}$, $\mathbf{22}_{BV}$ and $\mathbf{22}_{RV}$ correspond to the lower half of the screen.

As mentioned hereinbefore the dynamic convergence adjustment is based on the fact that an increasing saw-tooth-voltage or a decreasing saw-tooth voltage having a leading peak, when applied to a self-induction, will both generate currents of parabolic waveform through the self-induction.

In the present case where the waveform and the amplitude of the impulses produced in the FTB circuit primarily are chosen to match the vertical deflection coils, it may be desirable to provide for certain adjustments of the amplitude and waveform of the impulses, which are supplied to the convergence coils through the CV circuit to match the convergence coils, and to this purpose an impedance circuit may be inserted in the common lead 56. Such impedance circuit is indicated in FIGURE 4 in dotted lines and is designated by Z. The impedance circuit Z may for example include inductive elements by means of which the leading peaks of the impulses may be adjusted so as to generate the desired parabola-shaped current impulses in the convergence coils during the positive half-periods.

As will be understood from the foregoing, it will be possible by means of six adjustable tappings to correct the convergence for each of the three colors independently over the two screen halves. The corresponding part of the adjustment button panel may therefore be designed, for example as shown in FIGURE 5, where the upper three adjustment knobs correspond to the upper half of the screen, and the three lower knobs correspond to the lower half screen. By providing the adjustment knobs with identifications corresponding to the three colors and with arrows adjacent the button as shown in FIGURE 5, it is possible to indicate in which direction the inclination of the traces shown in FIGURE 2 can be varied, whereby the adjustment operation is substantially facilitated. With the non-adjusted trace pattern shown in FIGURE 2 and with rather simple instructions as to the use of the knobs shown in FIGURE 5 in agreement with the foregoing description it is evident even for unskilled personnel that the two left-hand knobs for the red trace should both be turned to the right in order to make the red trace $L_R$ to coincide with the blue trace $L_B$, and that the middle knobs $\mathbf{22}_{GT}$ and $\mathbf{22}_{GV}$ for the green trace should both be turned left in order to straighten the green trace $L_G$. In contradistinction to the prior convergence adjustment systems substantially no change in the convergence situation on one half screen takes place during adjustment of the convergence situation on the other half screen. When the two arcuate traces are substantially straightened out it only remains to use the blue color knobs $\mathbf{22}_{BT}$ and $\mathbf{22}_{BV}$ to correct for blue misconvergence. Practical experiences have shown that a person, who used one hour in his first attempt to adjust the dynamic convergence of a color television receiver having the conventional adjustment system would only need about ten minutes to perform the corresponding adjustment of an apparatus according to the invention.

In FIGURE 6 a schematic circuit diagram of a modified embodiment of the circuit of FIGURE 4 is shown. This embodiment differs from the embodiment of FIGURE 4 substantially only in that two diodes are used instead of the six diodes in FIGURE 4.

In the embodiment shown in FIGURE 6 the top ends of the potentiometers $\mathbf{24}_B$, $\mathbf{24}_G$ and $\mathbf{24}_R$ are connected together to a common lead 56', which in turn is connected through one diode 30' to the lead 56 from the secondary winding 58. The diode 30' is orientated, so as to only allow the positive half-periods to pass. In a similar way the top ends of the potentiometers $\mathbf{26}_B$, $\mathbf{26}_G$ and $\mathbf{26}_R$ are connected together to another common lead 56'', which in turn is connected through an oppositely orientated diode 32' to the common lead 56.

The embodiment of FIGURE 6 also differs from that of FIGURE 4 in that an impedance circuit Z' is connected as a shunt across one of the diodes, and in this case the impedance may include capacitive elements.

As will be appreciated, the circuits of the apparatus may be modified in many ways within the scope of the invention.

Obviously the invention is not limited to the use of the saw-tooth impulse generator for vertical deflection as a feeding means for the dynamic vertical convergence adjustment circuit as it will be appreciated that the apparatus may also be provided with a saw-tooth impluse generator particularly for this purpose.

It will also be appreciated that the characteristic adjustment of the invention with the three dynamic convergence being adjusted independently at each end of the tracing lines across the screen is not limited to be used in connection with the vertical convergence adjustment, but that an adjustment circuit for adjusting the horizontal dynamic convergence may be constructed in a similar manner.

I claim:

1. In an apparatus for reproducing color television signals including cathode ray tube having a picture screen with a system of fluorescent color dots and a plurality of electron guns operable to produce beams which will activate the corresponding color dots on the screen, means operable to deflect said beams simultaneously to move across said picture screen between the top and bottom thereof, coil means operatively connected with said electron guns being operable to correct for dynamic misconvergence which occurs in response to the deflection of said beams, an impulse generating circuit operable to produce impulses, circuit means operatively connecting said impulse generating circuit with said dynamic convergence correction coil for obtaining current of substantially parabolic wave form in said coil means thereby rendering said impulses operable to correct for dynamic misconvergence the improvement comprising, oppositely oriented rectifier means in said circuit means for rendering a positive portion of each impulse effective during deflection of said beams across a first portion of the screen between a substantially horizontal middle zone and one edge thereof, and a negative portion of each impulse effective during the deflection between said middle zone and the other edge of the screen and manually operable adjustment means connected to said dynamic convergence coil means to regulate the amplitude of said positive and negative impulse portions independently and thereby adjust dynamic convergence of each beam independently on each side of a middle zone of the picture screen.

2. In an apparatus for reproducing color television signals having cathode ray tube with a picture screen having a plurality of groups of fluorescent dots of different colors, a plurality of electron guns operable to produce beams which will activate one group of color dots on the screen, the improvement comprising in combination: means including saw-tooth shaped impulse generating means operable to deflect said beams simultaneously to move said beams between opposite edges of said picture screen, means operable to correct for dynamic misconvergence which occurs due to the deflection of said beams operatively connected with each of said electron guns, first rectifier means operatively connecting said impulse generating means with said dynamic convergence correction means for applying only a positive portion of each of said impulses which corresponds to substantially half of the movement of the beams between opposite edges of the picture screen to said dynamic convergence correction means, second rectifier means operatively connecting said impulse generating means with said dynamic convergence correction means for applying only a negative portion of each of said impulses which substantially corresponds to the other half of the movement of the beams between opposite edges of the picture screen to said dynamic convergence correction means and manually operable adjustment means operatively connected with each of said first and second connection means for adjusting the dynamic convergence of each beam independently in response to the effectiveness of said positive and said negative impulse portions respectively and thereby independently during the deflection of said beams on substantially each half part of the screen.

3. In an apparatus for reproducing color television signals having a cathode ray tube with a picture screen having a plurality of groups of fluorescent dots of different colors, a plurality of electron guns operable to produce beams which will activate one group of color dots on the screen the improvement comprising in combination: means including saw-tooth shaped impulse generating means operable to deflect said beams simultaneously to scan said picture screen between opposite edges thereof, means operable to correct for such dynamic misconvergence which occurs due to the deflection of said beams operatively connected with each of said electron guns, circuit means opratively connecting said impulse generating means with said dynamic convergence correction means including first circuit branch means for applying only a first portion of each of said impulses which substantially corresponds to half of the scanning between opposite edges of the picture screen to said dynamic convergence means and second circuit branch means for applying only a second portion of said impulses which substantially corresponds to the other half scanning of the screen to said dynamic convergence means and manually operable adjustment means operable independently in each of said first and second circuit branch means to adjust the dynamic convergence of each beam independently on substantially each half part of the screen.

4. In an apparatus for reproducing color television signals having a cathode ray tube with a picture screen having a plurality of groups of fluorescent dots of different colors, a plurality of electron guns operable to produce beams which will activate one group of color dots on the screen, the improvement comprising in combination: means including saw-tooth shaped impulse generating means operable to deflect said beams in a vertical direction between top and bottom of said picture screen, means operable to correct for dynamic misconvergence which occurs due to said vertical deflection of said beams operatively connected with each of said electron guns, means operatively connecting said impulse generating means with said dynamic convergence correction means including first means for applying only a first portion of each of said impulses which substantially corresponds to half of the vertical deflection to said dynamic convergence means, and second means for applying only a second portion of each of said impulses which corresponds to the other half of the vertical deflection to said dynamic convergence means, and manually operable adjustment means operable independently in said first and said second means for adjusting the vertical dynamic convergence of each beam independently on each half part of the screen.

5. In an apparatus for reproducing color television signals having a cathode ray tube with a picture screen having a plurality of groups of fluorescent dots of different colors, a plurality of electron guns operable to produce beams which will activate one group of color dots on the screen, the improvement comprising in combination: means including saw-tooth shaped impulse generating means operable to deflect said beams in a vertical direction between top and bottom of said picture screen, means operable to correct for dynamic misconvergence which occurs due to said vertical deflection of said beams operatively connected with each of said electron guns, circuit means operatively connecting said impulse deriving means with said dynamic convergence correction means having first circuit branch means including first valve means operable to render a first potrion of each of said impulses which substantially corresponds to half of the vertical deflection effective in said dynamic convergence means and second circuit branch means including second valve means operable to render a second portion of each of said impulses which corresponds to the other half of the vertical deflection operable in said dynamic convergence means, and manually operable adjustment means independently included in each of said circuit branch means operable to adjust the vertical dynamic convergence of each beam independently on each half part of the screen.

6. In an apparatus for reproducing color television signals having a shadow mask tube with a plurality of electron guns each operable to produce a beam responding to one of a plurality of different colors, a mask having a plurality of holes and a picture screen with a system of fluorescent dots operable to respond to each of said beams and disposed in such mutual relationship to the holes of said mask that when all of said beams are focused in one of the holes of said mask fluorescent dots corresponding to each of said plurality of colors will be activated, each by one of said beams, means operatively connected with said tube and being operable to deflect said beams simultaneously to scan said picture screen in horizontal as well as in vertical direction, a plurality of coil means operatively connected with said electron guns and being operable to correct for dynamic misconvergence which occurs due to the deflection of said beams by passing current of parabolic wave-form through said coil means, impulse generating circuit means operable to produce substantially saw-tooth shaped impulses, means operatively connecting said impulse generating means with said beam deflection means to control movement of said beams through a path across the picture screen between opposite edges thereof, means operatively connecting said impulse generating circuit means with said dynamic convergence coil means including oppositely directed rectifier means for suppying said coil means with positive and negative portions of said substantially saw-tooth shaped impulses to obtain current of parabolic wave-form in said coil means to thereby render said coil means effective to correct for dynamic misconvergence including first manually adjustable connection means operable to adjust the positive portion of said impulses which corresponds to substantially half of the travel path of said beams across the picture screen, and second manually adjustable connection means operable to adjust the negative portions of each of said impulses which corresponds to substantially the second half portion of said travel path.

7. In an apparatus for reproducing color television signals having a cathode ray tube with a picture screen having a plurality of groups of fluorescent dots of different colors, a plurality of electron guns operable to produce beams which will activate one group of color dots on the screen, the improvements comprising in combination: means operable to deflect said beams simultaneously between opposite edges of said picture screen, a plurality of coil means each operatively connected with said electron guns and operable to be rendered effective to correct for such dynamic misconvergence which occurs during the deflection of said beams in response to saw-tooth shaped impulses, impulse generating means for producing saw-tooth shaped impulses, means operatively connecting said impulse generating means with said beam deflection means to deflect said beams between said opposite picture edges, means operatively connecting said impulse generating means with said coil means including first connection means for rendering said coil means responsive to substantially half of each impulse only and second connection means for rendering said coil means responsive to the other half of each impulse only, and manually operable adjustment means operable independently in said first and said second connection means respectively.

8. In an apparatus for reproducing color television signals having a cathode ray tube with a picture screen having a plurality of groups of fluorescent dots of different colors, a plurality of electron guns operable to produce beams which will activate one group of color dots on the screen, the improvement comprising in combination: means operable to deflect said beams simultaneously between opposite edges of said picture screen, a plurality of coil means each operatively connected with said electron guns and operable to correct for dynamic misconvergence which occurs during the deflection of said beams in response to saw-tooth shaped impulses, impulse generating means operable to produce saw-tooth shaped impulses, means operatively connecting said impulse generating means with said beam deflection means to deflect said beams between said opposite picture screen edges, a plurality of circuit means operatively connecting said impulse generating means with said coil means including a first group of circuit means connected with each of said coil means for supplying substantially one half of each impulse to each coil means and a second group of circuit means for supplying the other half of each impulse to each of said coil means, and manually operable means in each one of said first and second groups of circuit means of said first and said second group for independently regulating the amplitude of each half impulse supplied to each of said coil means and thereby adjust the dynamic convergence of each beam independently on each side of a middle zone of the screen.

9. In an apparatus for reproducing color television signals having a cathode ray tube with a picture screen having a plurality of groups of fluorescent dots of different colors, a plurality of electron guns operable to produce beams which will activate one group of color dots on the screen the improvement comprising in combination: means operable to deflect said beams simultaneously between opposite edges of said picture screen, a plurality of coil means each operatively connected with said electron guns and operable to correct for dynamic misconvergence which occurs during the deflection of said beams in response to saw-tooth shaped impulses, impulse generating means operable to produce saw-tooth shaped impulses having a leading peak, means operatively connecting said impulse generating means with said beam deflection means to deflect said beams between said opposite picture screen edges, a plurality of circuit means operatively connecting said impulse generating means with said coil means having impedance means operable to change amplitude and waveform of said leading peak including a first group of circuit means connected with each of said coil means for supplying substantially one half of each impulse to each coil means and a second group of circuit means for supplying the other half of each impulse to each of said coil means, and manually operable means in each one of said circuit means of said first and said second group for independently regulating the amplitude of each half impulse supplied to each of said coil means and thereby adjust the dynamic convergence of each beam independently on each side of a middle zone of the screen.

10. In an apparatus for reproducing colored television signals having a shadow mask tube including a picture screen having a plurality of groups of fluorescent dots corresponding to red, blue and green color in each group, a mask having a plurality of holes corresponding to the number of dot groups and each one being assigned to a dot group, and three electron guns each corresponding to red, blue or green and operable to produce beams which when focused in any one of the holes of the mask will activate the color dots assigned to the hole, means operable to deflect said beams simultaneously between opposite edges of said picture screen, three convergence coil means each operatively connected with one of said electron guns and operable in response to supply of a saw-tooth shaped impulse to correct for such dynamic misconvergence which occurs by the deflection of said beams, impulse generating circuit means operable to produce saw-tooth shaped impulses, means operatively connecting said impulse generating circuit means with said beam deflection means to deflect said beams between said opposite picture screen edges, and a circuit network operatively connecting said impulse generating means with all said three dynamic convergence coil means through six manually adjustable potential regulating means leading to each end of each coil means and through oppositely orientated valve means operatively connected to render all of said coil means effective for alternative positive and negative half parts of each of said impulses and thereby to render each of said manually adjustable potential regulating means operable to adjust the dynamic convergence of each appertaining color independently on each side of a middle zone of the screen.

11. In an apparatus for reproducing color television signals having a shadow mask tube including a picture screen having a plurality of groups of fluorescent dots corresponding to red, blue and green color in each group, a mask having a plurality of holes corresponding to the number of dot groups and each one being assigned to a dot group, and three electron guns each corresponding to red, blue or green and operable to produce beams which when converging in any one of the holes of the mask will activate the color dots assigned to the hole, means operable to deflect said beams simultaneously in vertical direction between top and bottom edges of said picture screen, three coil means each operatively connected with one of said electron guns and operable in response to supply of a series of voltage impulses to correct for such dynamic misconvergence which occurs due to the vertical deflection of said beams, said voltage impulses having substantially saw-tooth shaped wave-form, impulse generating circuit means operable to produce said voltage impulses, means operatively connecting said impulse generating circuit means with said beam deflection means to deflect said beams between said top and bottom picture screen edges, and impedance means effectively influencing the wave-form of said voltage impulses and operatively connecting said impulse generating means with all said three vertical dynamic convergence coil means through three pairs of manually adjustable potential regulating means of which each potential regulating means of each pair leads to one end of one of said coil means through three corresponding pairs of oppositely orientated rectifier means operatively connected to render said coil means effective for alternative positive and negative portions of each of said impulses to thereby render each of said manually adjustable potential regulating means operable to adjust the vertical dynamic convergence of each respective electron beam independently on each side of a horizontal middle zone of the screen.

12. In an apparatus for reproducing color television signals having a cathode ray tube with a picture screen having a plurality of dots of different colors, a plurality of electron guns operable to produce beams which will activate respective color dots on the screen, the improvement comprising in combination: means including saw-tooth shaped voltage impulse generating means operable to deflect said beams in vertical direction between top and bottom of said picture screen, means operable to correct for such dynamic misconvergence which occurs due to said vertical deflection of said beams, and manually operable adjustment means connected to said vertical dynamic convergence means for adjusting the vertical dynamic convergence independently for each electron beam independently on top and bottom half parts of the screen.

13. In an apparatus for reproducing colored television signals having a shadow mask tube including a picture screen having a plurality of groups of fluorescent dots corresponding to red, blue and green color in each group, a mask having a plurality of holes corresponding to the number of dot groups and each one being assigned to a dot group, and three electron guns each corresponding to red, blue or green dots and operable to produce beams which when converging in any one of the holes of the mask will activate the corresponding color dots assigned to the hole, means operable to deflect said beams simultaneously between opposite edges of said picture screen in response to supply of voltage impulses having saw-tooth shaped wave-form, three coil means each operatively connected with one of said electron guns and operable in response to supply of saw-tooth shaped impulses having a leading peak to correct for such dynamic misconvergence which occurs by the deflection of said beams, impulse generating circuit means producing saw-tooth shaped impulses, means operatively connecting said impulse generating means with said beam deflection means to deflect said beams between said opposite picture screen edges, said deflection means effectively producing said leading peaks, and a circuit network operatively connecting said coil means including six manually adjustable impulse amplitude regulating means, each leading to an end of each coil means, two oppositely orientated valve means operatively connected to render all of said coil means effective for alternative positive and negative portions of each of said impulses and thereby to render each of said manually adjustable potential regulating means operable to adjust the dynamic convergence independently for each electron beam independently on each side of a middle zone of the screen, and impedance means connected with one of said valve means to effectively adjust the amplitude of said leading peak.

References Cited

UNITED STATES PATENTS

| | | | |
|---|---|---|---|
| 3,141,109 | 7/1964 | Chandler | 315—22 |
| 3,187,218 | 6/1965 | E'Del | 315—22 |

RODNEY D. BENNETT, *Primary Examiner.*

M. F. HUBLER, *Assistant Examiner.*